United States Patent
Kashima et al.

(10) Patent No.: US 9,261,867 B2
(45) Date of Patent: Feb. 16, 2016

(54) PARAMETER ACQUIRING DEVICE AND METHOD, FOR DEFINING DATA PAIRS FOR VALVE CONTROL IN AN OPENING AND CLOSING DIRECTION

(71) Applicant: Azbil Corporation, Tokyo (JP)

(72) Inventors: Toru Kashima, Tokyo (JP); Satoshi Yuzawa, Tokyo (JP); Takashi Nomiyama, Tokyo (JP); Keisuke Narumi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 407 days.

(21) Appl. No.: 13/792,824

(22) Filed: Mar. 11, 2013

(65) Prior Publication Data

US 2013/0238137 A1 Sep. 12, 2013

(30) Foreign Application Priority Data

Mar. 12, 2012 (JP) .................... 2012-054763

(51) Int. Cl.
*G05B 15/02* (2006.01)
*F15B 5/00* (2006.01)

(52) U.S. Cl.
CPC ............... *G05B 15/02* (2013.01); *F15B 5/006* (2013.01)

(58) Field of Classification Search
CPC ...... G05B 15/02; G05B 19/042; G05D 16/00; F15B 5/006; F15B 21/00
USPC ............................. 700/275, 28, 32, 37, 44, 45
See application file for complete search history.

(56) References Cited

U.S. PATENT DOCUMENTS

| | | | | |
|---|---|---|---|---|
| 5,590,677 A | * | 1/1997 | Kuroda | ........................ 137/85 |
| 5,687,098 A | * | 11/1997 | Grumstrup et al. | ........... 700/282 |
| 5,931,180 A | | 8/1999 | Nagasaka | |
| 6,546,920 B1 | * | 4/2003 | Kawamura et al. | ...... 123/568.23 |
| 6,675,783 B1 | * | 1/2004 | Kawamura et al. | ...... 123/568.23 |

FOREIGN PATENT DOCUMENTS

| | | | | |
|---|---|---|---|---|
| JP | S62-28118 U | | 2/1987 | |
| JP | 10122059 A | * | 5/1998 | ............. F02M 25/07 |
| JP | 11-166655 A | | 6/1999 | |
| JP | 2001-075651 A | | 3/2001 | |
| JP | 2002-39106 A | | 2/2002 | |
| JP | 2003-308101 A | | 10/2003 | |
| JP | 3511458 B2 | | 3/2004 | |
| JP | 4244507 B2 | | 1/2009 | |
| JP | 4244507 B2 | | 3/2009 | |

OTHER PUBLICATIONS

Japanese Office Action mailed Sep. 29, 2015, issued in corresponding Japanese Patent Application No. 2012-054763.

* cited by examiner

*Primary Examiner* — M.N. Von Buhr
(74) *Attorney, Agent, or Firm* — Troutman Sanders LLP (57) ABSTRACT

A parameter acquiring device for acquiring parameters for a control valve has a controlling valve operating unit, a valve opening signal acquiring unit and a parameter calculator. The controlling valve operating unit operates a controlling valve in an opening direction and in a closing direction by changing, in a specific sequence, a control signal that controls an opening of a regulator valve. The valve opening signal acquiring unit acquires a signal indicating an actual opening of the regulator valve. The parameter calculator acquires data pairs of control signals and valve opening signals. The parameter calculator calculates a parameter of the control valve based on the data pairs that have been acquired.

8 Claims, 8 Drawing Sheets

Background Art

FIG. 7

Background Art

FIG. 8

Background Art

PARAMETER ACQUIRING DEVICE AND METHOD, FOR DEFINING DATA PAIRS FOR VALVE CONTROL IN AN OPENING AND CLOSING DIRECTION

CROSS REFERENCE TO RELATED APPLICATION

This application claims priority to Japanese Patent Application No. 2012-054763, filed on Mar. 12, 2012, the entire content of which being hereby incorporated herein by reference.

FIELD OF TECHNOLOGY

The present invention relates to a parameter acquiring device and method for acquiring parameters for a control valve that is structured from a regulator valve and a positioner that controls the opening of the regulator valve.

BACKGROUND

Conventionally, in chemical plants, and the like, positioners are provided for regulator valves that are used in flow rate processes, where the openings of the regulator valves are controlled by the positioners. A positioner is provided with a calculating portion for calculating a deviation between an opening setting value, which is sent from a higher-level device, and the actual opening that is fed back from the regulator valve, to generate, as a control output, a control signal that is dependent on that deviation, an electropneumatic converting device for converting the control output that is generated by the calculating portion into a pneumatic pressure signal, and a pilot relay for amplifying the pneumatic pressure signal, converted by the electropneumatic converting device, and outputting it to an operating device of the regulator valve as an amplified pneumatic pressure signal. See, for example, Japanese Unexamined Utility Model Registration Application Publication S62-28118.

Figure 6:
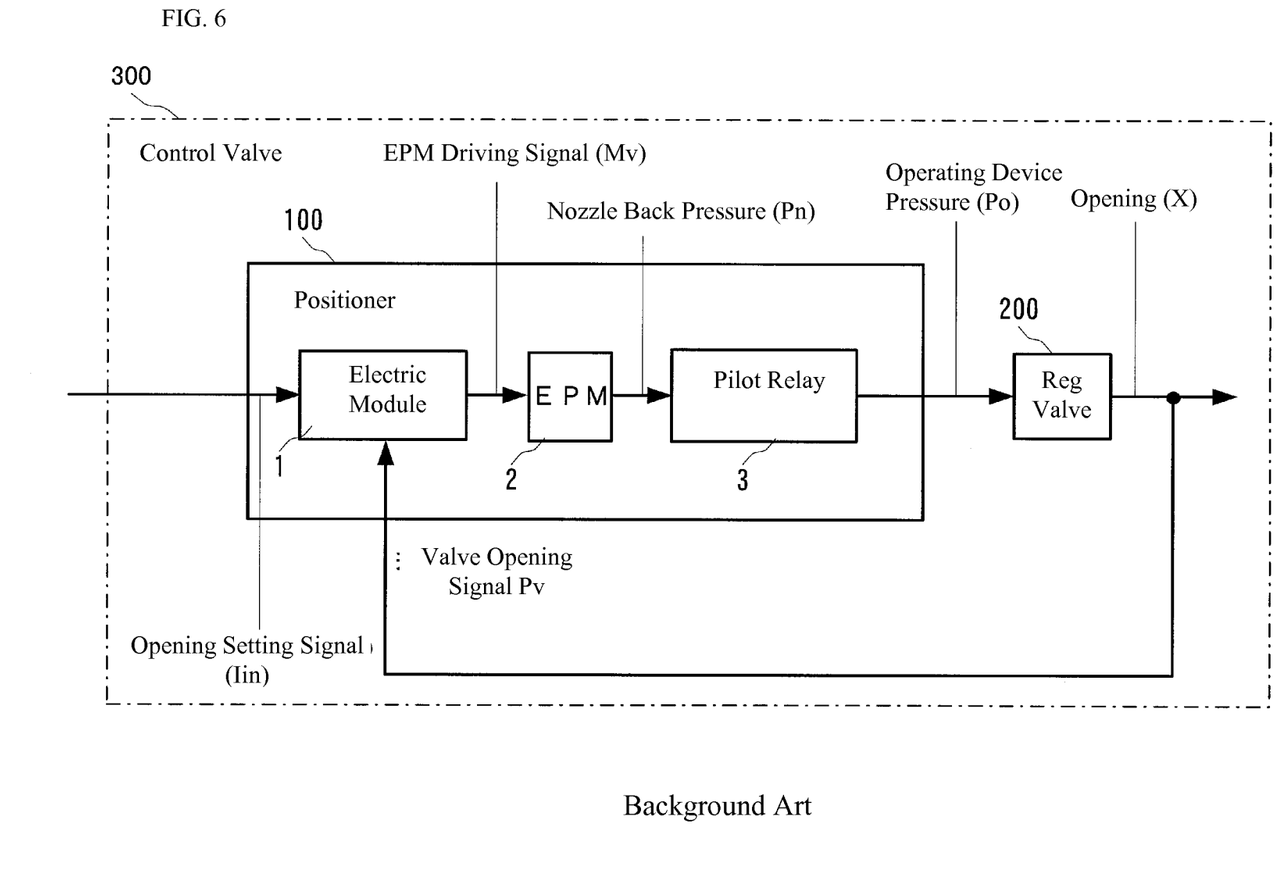
FIG. 6 is a diagram illustrating the flow of input/output signals in a control valve structured from a positioner and a regulator valve.

FIG. 6 illustrates the flow of input/output signals in a control valve structured from a positioner and a regulator valve. In this figure, 100 is the positioner, 200 is the regulator valve, and 300 is the control valve that is structured from the positioner 100 and the regulator valve 200, where the positioner 100 is provided with an electric module 1, an EPM (an electropneumatic converting module) 2, and a pilot relay (a pneumatic pressure amplifying module) 3.

The electric module 1 inputs an opening setting signal Iin and a signal (the valve opening signal) Pv that indicates the actual opening X of a valve, fed back from the regulator valve 200, to produce, as a control output, an EPM driving signal (a PWM signal (duty signal)) Mv. The EPM 2 inputs the EPM driving signal Mv from the electric module 1, and converts this EPM driving signal Mv into a nozzle back pressure Pn. The pilot relay 3 inputs the nozzle back pressure Pn from the EPM 2, to produce the operating device pressure Po from the nozzle back pressure Pn. The regulator valve 200 inputs the operating device pressure Po from the positioner 100, to regulate the opening X of the valve depending on the operating device pressure Po.

Figure 7:
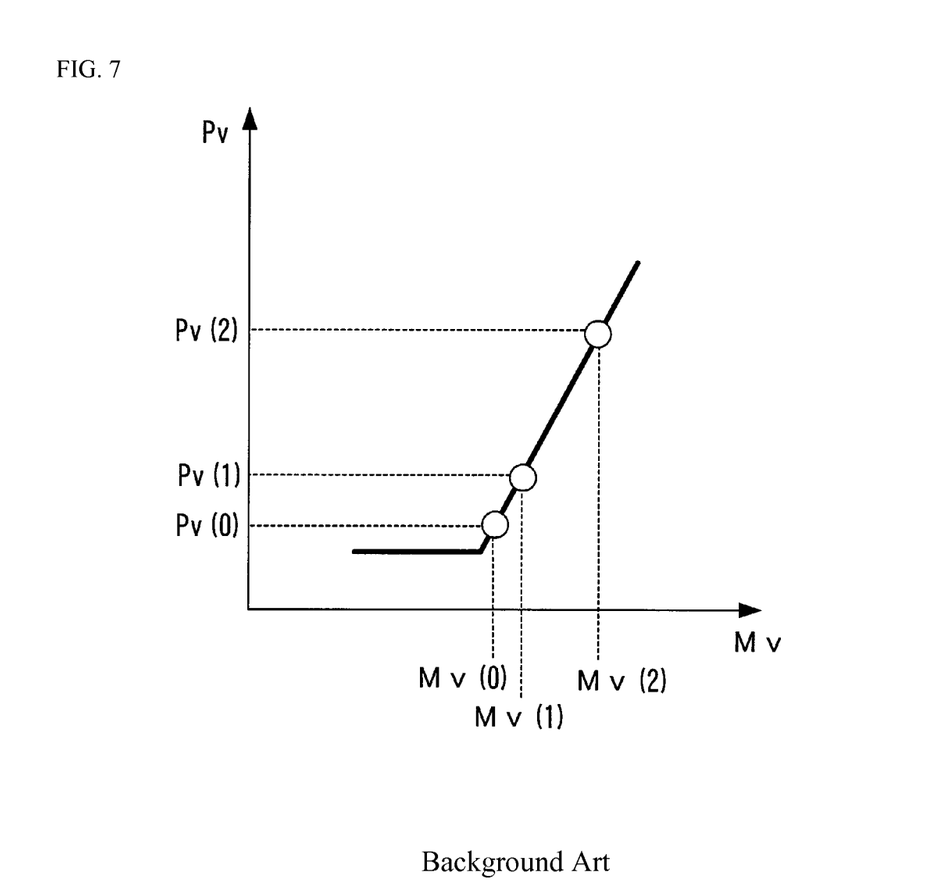
FIG. 7 is a diagram for explaining the operations when acquiring the gain input/output characteristic of the control valve for the positioner illustrated in Japanese Patent 4244507.

In such a control valve 300, the positioner 100 has an auto tuning function, and, for example, automatically obtains the gain of the input/output characteristics of the control valve 300 in order to determine the control parameter. For example, in the positioner disclosed in Japanese Patent 4244507, as illustrated in FIG. 7, the initial value Mv(0) for the EPM driving signal Mv is outputted and a check is performed as to whether or not the valve opening signal Pv(0) is in the operating range, the EPM driving signal Mv(1) is outputted and the valve opening signal Pv(1) is obtained, following which the EPM driving signal Mv(2) is outputted and the valve opening signal Pv(2) is obtained, and the input/output characteristic gain of the control valve is calculated from the amount of change between the EPM drive signals Mv(1) and Mv(2) and the amount of change between the valve opening signals Pv(1) and Pv(2). In this case, the EPM drive signals Mv are changed in the same direction, that is, the opening of the valve is changed in the same direction, and thus the input/output characteristic gain is calculated with the hysteresis canceled out.

Figure 8:
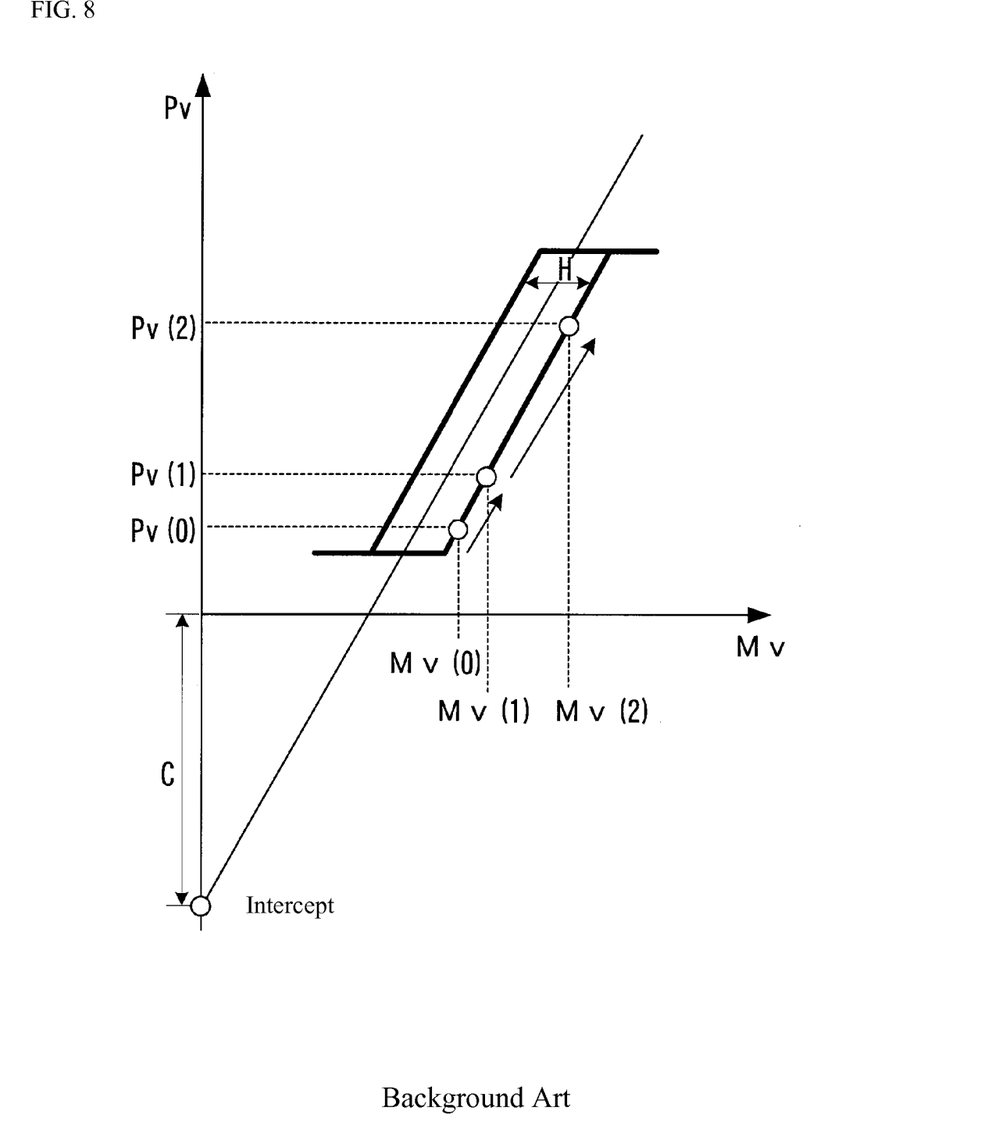
FIG. 8 is a diagram illustrating the relationship between the EPM driving signal Mv and the valve opening signal Pv (the input/output characteristics) in the case of a reciprocating operation of the regulator valve.

However, in the method illustrated in FIG. 7, it is not possible to calculate all at once parameters such as input/output characteristic hysteresis and intercept, and the like, through the single action of calculating the gain for the input/output characteristics. FIG. 8 illustrates the relationship between the EPM driving signal Mv and the valve opening signal Pv (that is, the input/output characteristics) when the regulator valve is caused to undergo reciprocating motion. In these input/output characteristics, H indicates a hysteresis and C indicates the intercept.

Note that hysteresis is used when determining control parameters (referencing, for example, Japanese Patent 3511458), and used as a parameter in fault evaluations. In Japanese Unexamined Patent Application Publication 2003-308101, for example, the hysteresis is used in a comparison with the frictional force at the time of proper operation. The intercept can be used as a parameter when calculating a fluid reactive force.

The present invention was created in order to solve such problems, and an aspect of the present invention is to provide a parameter acquiring device and method wherein it is possible to calculate all at once other parameters, such as hysteresis and the intercept, in a single operation of calculating the gain of the input/output characteristics.

SUMMARY

In order to achieve the above-described aspect, the present invention provides a parameter acquiring device for acquiring parameters for a control valve that is structured from a regulator valve and a positioner that controls the opening of the regulator valve. The parameter acquiring device has a controlling valve operating unit that operates a controlling valve in an opening direction and in a closing direction by changing, in a specific sequence, a control signal that controls the opening of the regulator valve, a valve opening signal acquiring unit that acquires, as a valve opening signal, a signal indicating the actual opening of the regulator valve, a parameter calculator that defines, as a first data pair, the valve opening signal and the control signal when the regulator valve is at a first intermediate opening when the regulator valve is operating in the opening direction, defines, as a second data pair, the valve opening signal and the control signal when the regulator valve is at a second intermediate opening when the regulator valve is operating in the opening direction, defines, as a third data pair, the valve opening signal and the control signal when the regulator valve is at a third intermediate opening when the regulator valve is operating in the closing direction, defines, as a fourth data pair, the valve opening signal and the control signal when the regulator valve is at a fourth intermediate opening when the regulator valve is operating in the closing direction, acquires at least three of the first through fourth data pairs, and calculates a parameter of the control valve based on the data pairs that have been acquired.

In this invention, if, for example, a first intermediate opening and a fourth intermediate opening are defined as the same opening, a second intermediate opening and a third intermediate opening are defined as the same opening, the valve opening signal at the first intermediate opening for a regulator valve when the regulator valve is operating in the opening direction is defined as Pv(1) and the control signal at that time is defined as Mv(1-1), the valve opening signal at the second intermediate opening for a regulator valve when the regulator valve is operating in the opening direction is defined as Pv(2) and the control signal at that time is defined as Mv(2-1), and the valve opening signal at the third intermediate opening for a regulator valve when the regulator valve is operating in the closing direction is defined as Pv(2) and the control signal at that time is defined as Mv(2-2), the valve opening signal at the fourth intermediate opening for a regulator valve when the regulator valve is operating in the closing direction is defined as Pv(1) and the control signal at that time is defined as Mv(1-2), then, of a first data pair (Pv(1), Mv(1-1)), a second data pair (Pv(2), Mv(2-1)), a third data pair (Pv(2), Mv(2-2)), and a fourth data pair (Pv(1), Mv(1-2)), at least three data pairs are acquired, and the parameters of the control valve are calculated based on the data pairs that are acquired.

For example, when the first data pair (Pv(1), Mv(1-1)), the second data pair (Pv(2), Mv(2-1)), the third data pair (Pv(2), Mv(2-2)), and the fourth data pair (Pv(1), Mv(1-2)) are used, the gain G can be calculated following Equation (a), below, the hysteresis H can be calculated following Equation (b), below, and the intercept C can be calculated following Equation (c), below.

$$G = 2 \times (Pv(2) - Pv(1)) / \{(Mv(2-1) + Mv(2-2)) - (Mv(1-1) + Mv(1-2))\} \quad (a)$$

$$H = \{(Mv(2-1) - Mv(2-2)) + (Mv(1-1) - Mv(1-2))\}/2 \quad (b)$$

$$C = Pv(1) - G \times (Mv(1-1) + Mv(1-2))/2 \quad (c)$$

For example, when the first data pair (Pv(1), Mv(1-1)), the second data pair (Pv(2), Mv(2-1)), and the third data pair (Pv(2), Mv(2-2)) are used, the gain G can be calculated following Equation (d), below, the hysteresis H can be calculated following Equation (e), below, and the intercept C can be calculated following Equation (f), below.

$$G = (Pv(2) - Pv(1))/(Mv(2-1) - Mv(1-1)) \quad (d)$$

$$H = Mv(2-1) - Mv(2-2) \quad (e)$$

$$C = Pv(2) - G \times (Mv(2-1) + Mv(2-2))/2 \quad (f)$$

For example, when the first data pair (Pv(1), Mv(1-1)), the second data pair (Pv(2), Mv(2-1)), and the fourth data pair (Pv(1), Mv(1-2)) are used, the gain G can be calculated following Equation (g), below, the hysteresis H can be calculated following Equation (h), below, and the intercept C can be calculated following Equation (i), below.

$$G = (Pv(2) - Pv(1))/(Mv(2-1) - Mv(1-1)) \quad (g)$$

$$H = Mv(1-1) - Mv(1-2) \quad (h)$$

$$C = Pv(1) - G \times (Mv(1-1) + Mv(1-2))/2 \quad (i)$$

In this invention, the first intermediate opening and the fourth intermediate opening, and the second intermediate opening and the third intermediate opening, need not necessarily be identical openings, but all may be different openings. Even if all are different openings, the gain G, the hysteresis H, and the intercept C can still all be calculated easily using geometric calculations. Moreover, a control parameter for operating in the opening direction, for use when the regulator valve is operating in the opening direction, can be calculated based on the first data pair and the second data pair, and a control parameter for operating in the closing direction, for use when the regulator valve is operating in the closing direction, can be calculated based on the third data pair and the fourth data pair.

Moreover, in the present invention the control signal may use an input signal into a positioner, a drive signal into an electropneumatic converter within a positioner, an input pressure into a pressure amplifier within a positioner, or an input pressure from a positioner into an operating device for driving the regulator valve.

Moreover, the present invention may be embodied as a parameter acquiring method rather than a parameter acquiring device.

In the present invention, a valve opening signal, and the control signal at that time, at a first intermediate opening of a regulator valve when the regulator valve is operating in the opening direction is defined as a first data pair, a valve opening signal, and the control signal at that time, at a second intermediate opening of a regulator valve when the regulator valve is operating in the opening direction is defined as a second data pair, a valve opening signal, and the control signal at that time, at a third intermediate opening of a regulator valve when the regulator valve is operating in the closing direction is defined as a third data pair, and a valve opening signal, and the control signal at that time, at a fourth intermediate opening of a regulator valve when the regulator valve is operating in the closing direction is defined as a fourth data pair, and at least three of these first through fourth data pairs are acquired, to calculate control valve parameters based on the data pairs that have been acquired, thus making it possible to calculate, all at once, other parameters, such as the hysteresis and the intercept, in the same single operation as calculating the gain of the input/output characteristics.

Moreover, because, in the present invention, other parameters, such as the hysteresis and the intercept, can be calculated all at once in the single operation for calculating the gain of the input/output characteristics, that is, because the function for calculating the other parameters such as the hysteresis and the intercept, and the like, can be combined with the function for calculating the gain of the input/output characteristics, it is possible to eliminate any cost increases that would result from the additional function.

Furthermore, combining these functions ties to an increase in operational efficiency and a decrease in operating errors on behalf of an operator who would have to handle many different types of operations since a behavior to be understood in advance can be limited to one behavior when setting the fault evaluating parameters separately from the control parameters rather than performing automatic tuning.

DETAILED DESCRIPTION

Figure 1:
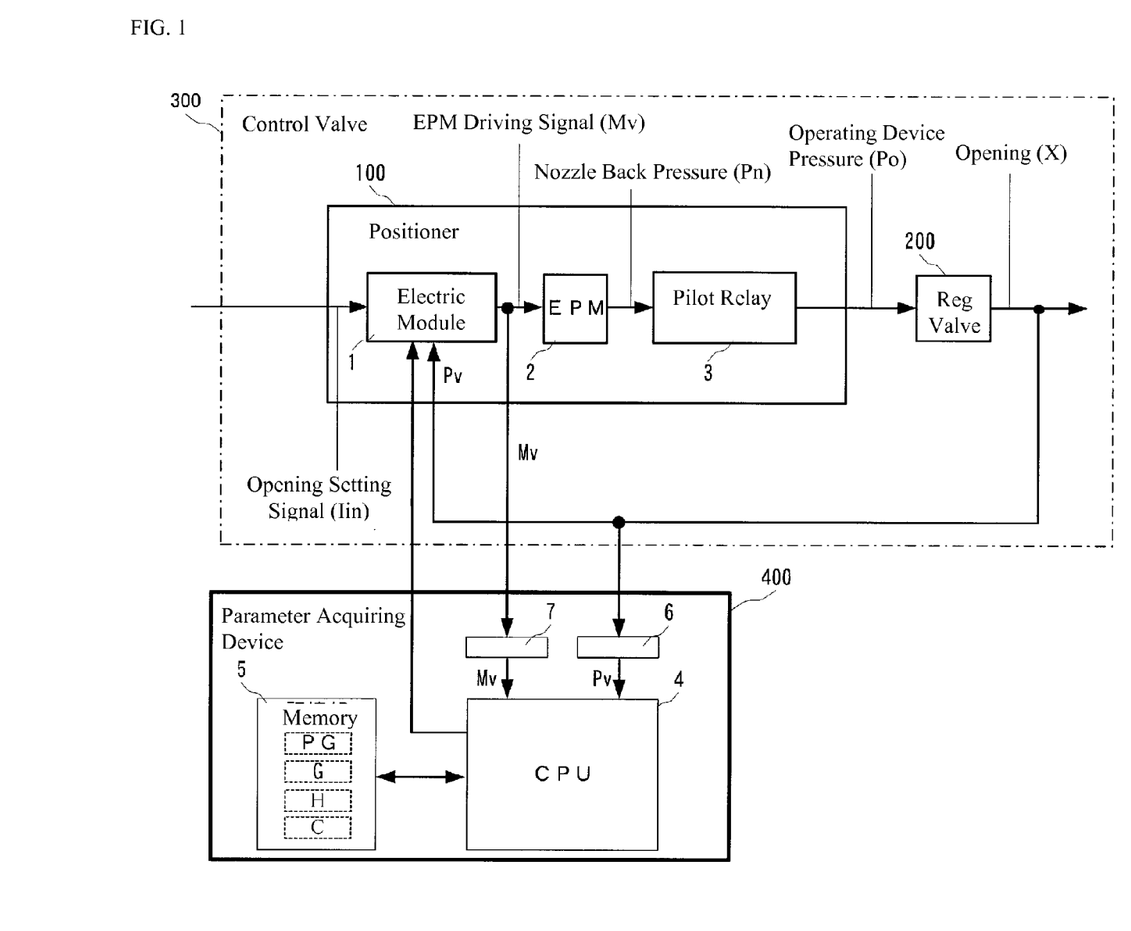
FIG. 1 is a diagram illustrating the structure of an example of a parameter acquiring device according to the present invention.

Examples according to the present invention will be explained below in detail, based on the drawings. FIG. 1 is a diagram illustrating an example of a parameter acquiring device according to the present invention. In this figure, codes that are the same as those in FIG. 6 indicate identical or equivalent structural elements as the structural elements explained in reference to FIG. 6, and explanations thereof are omitted.

In the example, a parameter acquiring device 400 is provided with a CPU 4, a memory portion 5 such as a ROM or a RAM, and interfaces 6 and 7.

Note that this parameter acquiring device 400 may be provided within a positioner 100, or may be provided outside of the positioner 100. FIG. 1 illustrates the example wherein it is provided outside of the positioner 100.

The CPU 4 branch inputs, through the interface 6, the valve opening signal Pv that is fed back from the regulator valve 200, and branch inputs, through the interface 7, the EPM drive signal Mv from the electric module 1 to the EPM 2. Furthermore, the CPU 4 operates following a parameter acquiring program PG that is stored in the memory portion 5 to send, to the electric module 1, operating instructions S1 for changing the EPM drive signal Mv in a specific sequence.

Example

Figure 2:
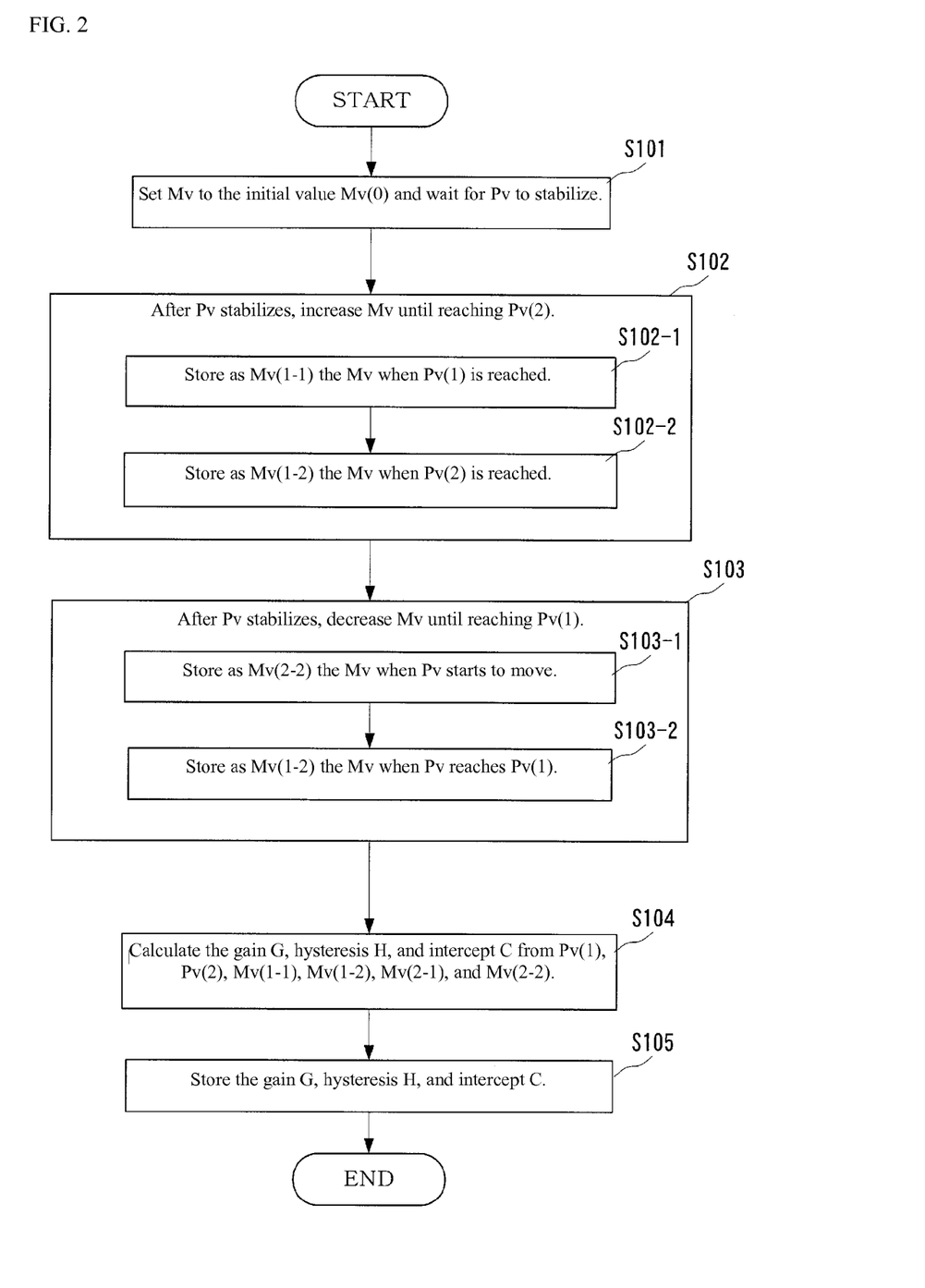
FIG. 2 is a flowchart of Example of a processing operation executed by a CPU in the parameter acquiring device.
Figure 3:
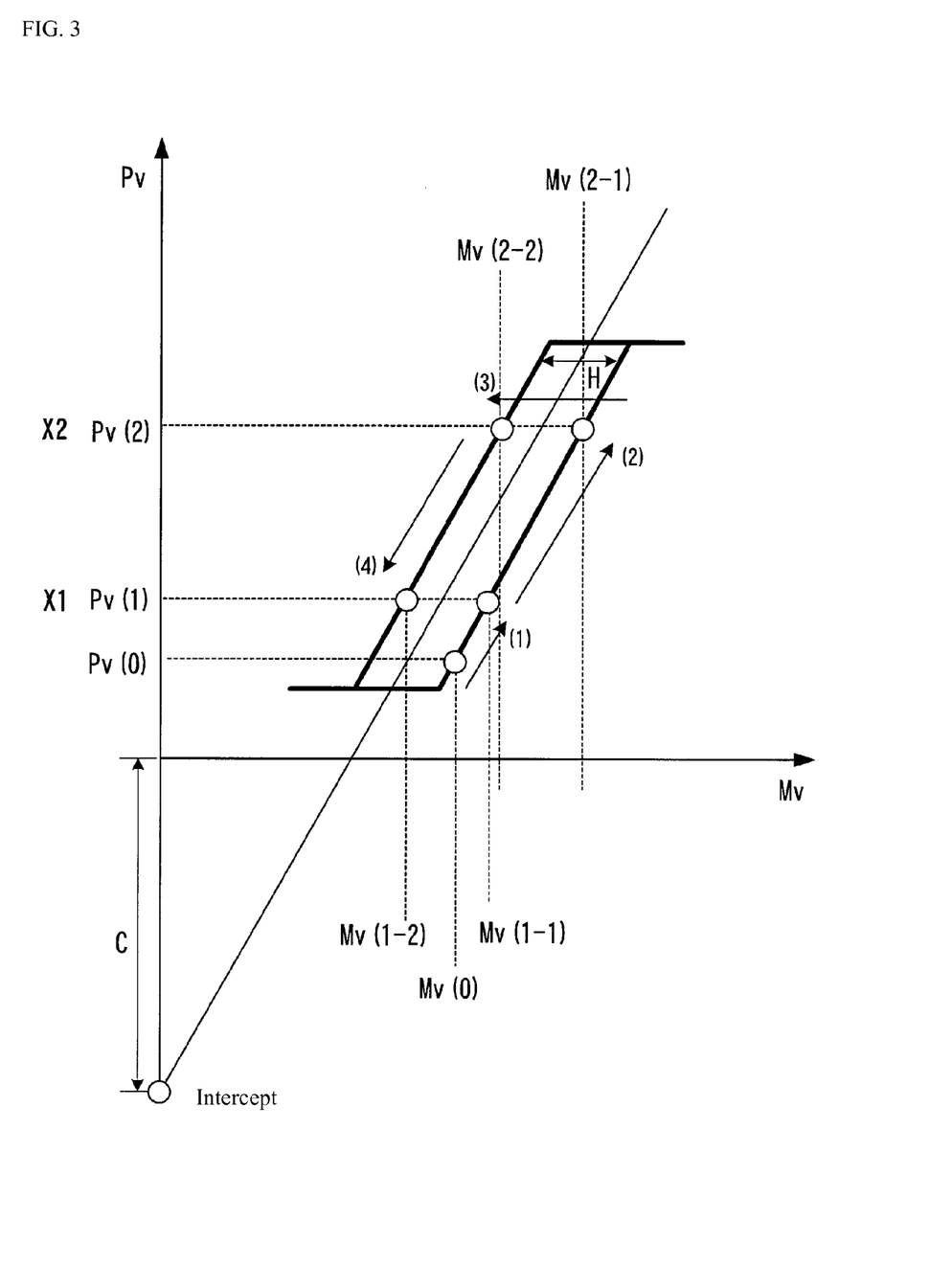
FIG. 3 is a diagram illustrating the change sequence of the EPM driving signal Mv in response to operating instructions from the CPU in the Example.

FIG. 2 and FIG. 3 will be referenced below to explain Example of processing operations executed by the CPU 4 following the parameter acquiring program PG.

Note that FIG. 2 shows a flowchart of the processing operations executed by the CPU 4, and FIG. 3 shows the sequence of changes in the EPM drive signal Mv in response to operating instructions S1 from the CPU 4. In the below, the EPM drive signal Mv that changes in response to an operating instruction S1 will be termed a "control signal."

The CPU 4 sets the control signal Mv to an initial value Mv(0), and waits for the valve opening signal Pv to stabilize (Step S101). After the valve opening signal Pv has stabilized to become the valve opening signal Pv(0), the control signal Mv is increased until the valve opening signal Pv goes to Pv(2) (Step S102). This causes the regulator valve 200 to operate in the opening direction.

In the process of increasing the valve opening signal Pv from Pv(0) to Pv(2), the CPU 4 stores, as a control signal Mv(1-1) at a first intermediate opening X1, the control signal Mv at the time that the valve opening signal Pv has reached Pv(1) (Step S102-1, referencing Arrow (1) in FIG. 3), and stores as the control signal Mv(2-1) at a second intermediate opening X2 the control signal Mv from when the valve opening signal Pv reached Pv(2) (Step S102-2, referencing Arrow (2) in FIG. 3).

Following this, when the CPU 4 confirms that the valve opening signal Pv has reached Pv(2), it reduces the control signal Mv until the valve opening signal Pv reaches Pv(1) (Step S103). This causes the regulator valve 200 to operate in the closing direction.

In the process of decreasing the valve opening signal Pv from Pv(2) to Pv(1), the CPU 4 stores, as a control signal Mv(2-2) at a second intermediate opening X2, the control signal Mv at the time that the valve opening signal Pv begins to move (Step S103-1, referencing Arrow (3) in FIG. 3), and stores as the control signal Mv(1-2) at the first intermediate opening X1 the control signal Mv from when the valve opening signal Pv reached Pv(1) (Step S103-2, referencing Arrow (4) in FIG. 3).

Moreover, the CPU 4 defines Pv(1) and Mv(1-1) as a first data pair, Pv(2) and Mv(2-1) as a second data pair, Pv(2) and Mv(2-2) as a third data pair, and Pv(1) and Mv(1-2) as a fourth data pair, and calculates, from the first data pair (Pv(1), Mv(1-1)), the second data pair (Pv(2), Mv(2-1)), the third data pair (Pv(2), Mv(2-2)), and the fourth data pair (Pv(1), Mv(1-2)), the input/output characteristic gain G, the hysteresis H, and the intercept C, for the control valve 300 all at once (Step S104).

At this time, the CPU 4 calculates the gain G following Equation (1), below, calculates the hysteresis H following Equation (2), below, and calculates the intercept C following Equation (3), below:

$$G = 2 \times (Pv(2) - Pv(1)) / \{(Mv(2\text{-}1) + Mv(2\text{-}2)) - (Mv(1\text{-}1) + Mv(1\text{-}2))\} \quad (1)$$

$$H = \{(Mv(2\text{-}1) - Mv(2\text{-}2)) + (Mv(1\text{-}1) - Mv(1\text{-}2))\}/2 \quad (2)$$

$$C = Pv(1) - G \times (Mv(1\text{-}1) + Mv(1\text{-}2))/2 \quad (3)$$

Note that Equation (1) is an equation that that may be rewritten as:

$$G = (Pv(2) - v(1)) / [\{(Mv(2\text{-}1) + Mv(2\text{-}2))/2\} - \{(Mv(1\text{-}1) + Mv(1\text{-}2))/2\}]$$

After this, the CPU 4 stores the calculated gain G, the hysteresis H, and the intercept C in the memory portion 5 as parameters for the control valve 300 (Step S105).

Another Example

Figure 4:
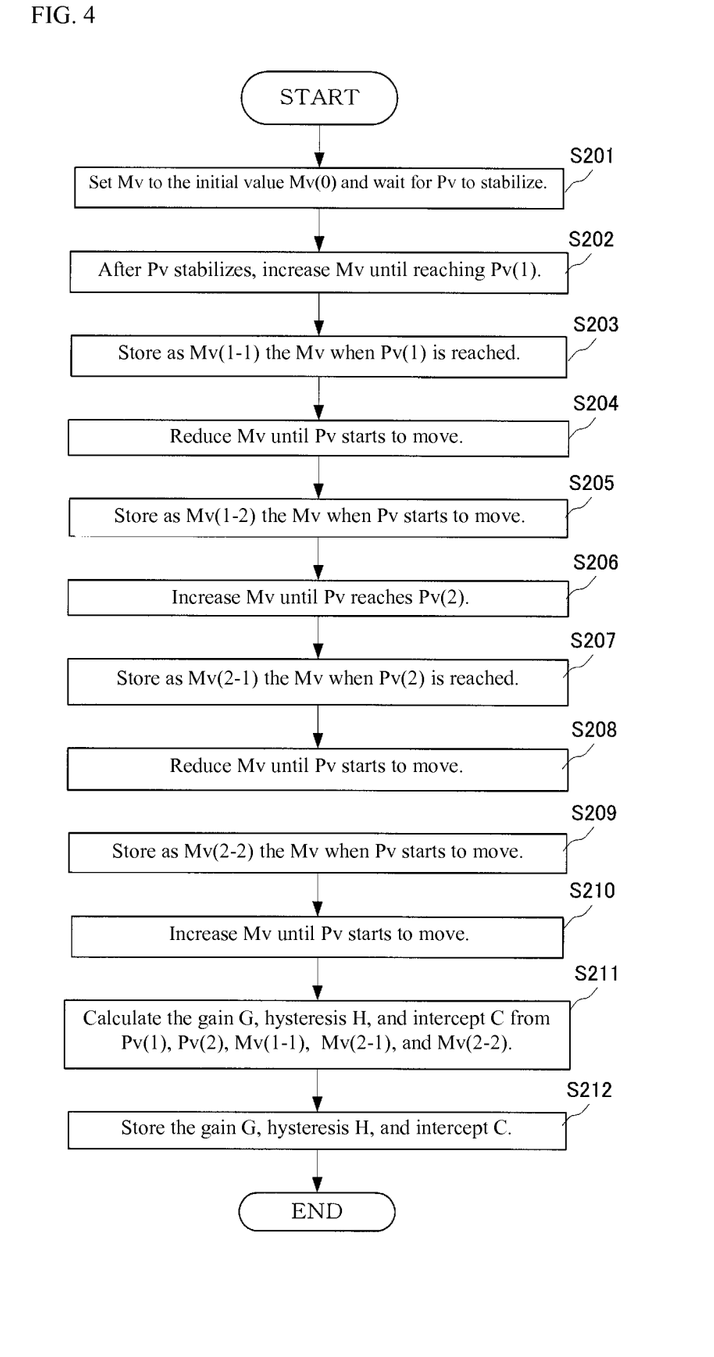
FIG. 4 is a flowchart of Another Example of a processing operation executed by a CPU in the parameter acquiring device.
Figure 5:
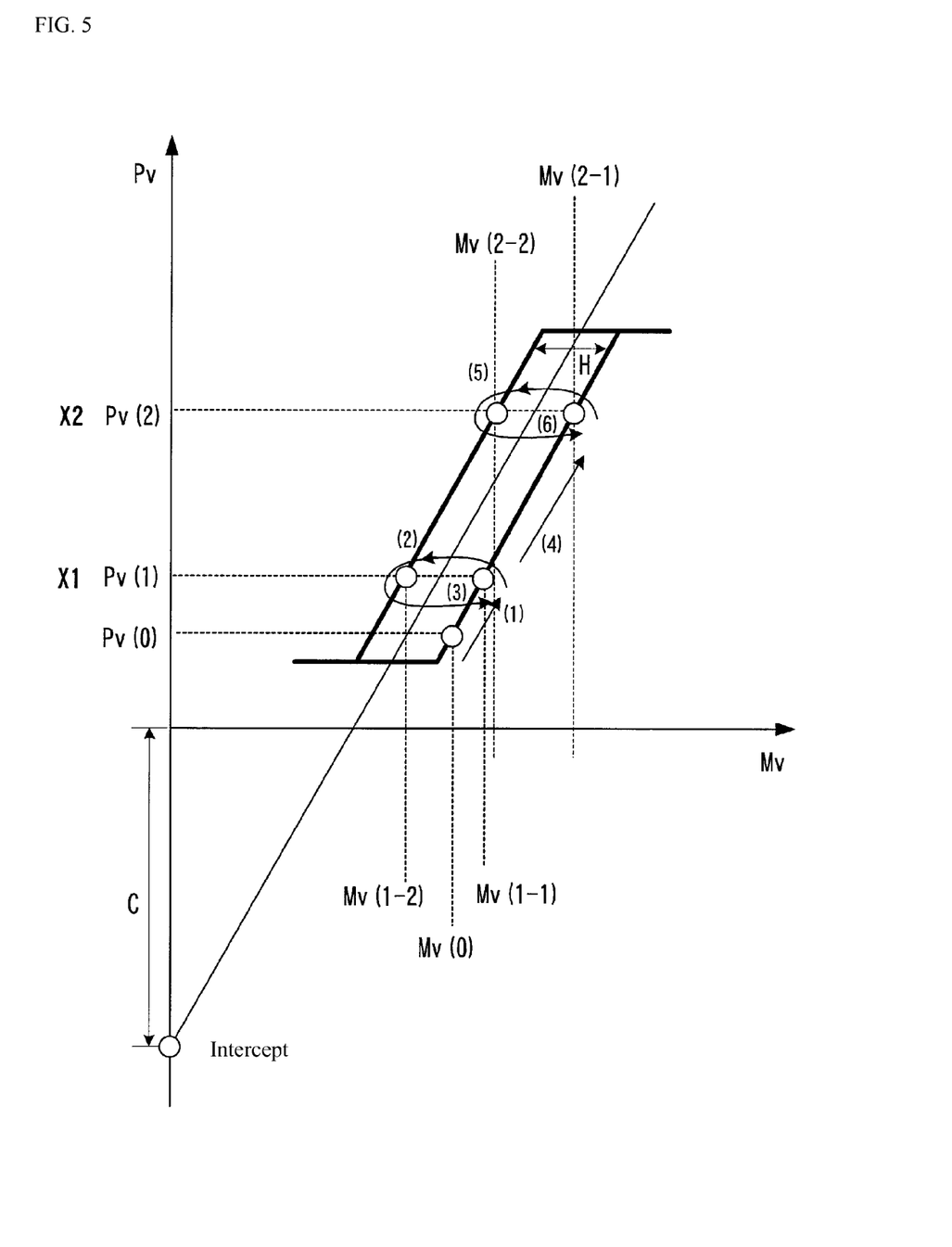
FIG. 5 is a diagram illustrating the change sequence of the EPM driving signal Mv in response to operating instructions from the CPU in the Another Example.

FIG. 4 and FIG. 5 will be referenced next to explain Another Example of processing operations executed by the CPU 4 following the parameter acquiring program PG.

The CPU 4 sets the control signal Mv to an initial value Mv(0), and waits for the valve opening signal Pv to stabilize (Step S201). After the valve opening signal Pv has stabilized to become the valve opening signal Pv(0), the control signal Mv is increased until the valve opening signal Pv arrives at to Pv(1) (Step S202, referencing Arrow (1) in FIG. 5). This causes the regulator valve 200 to operate in the opening direction.

Following this, the CPU 4 stores, as the control signal Mv(1-1) at the first intermediate opening X1, the control signal Mv at the time that the valve opening signal Pv has reached Pv(1) (Step S203).

Following this, when the CPU 4 confirms that the valve opening signal Pv has reached Pv(1), it reduces the control signal Mv until the valve opening signal Pv begins to move (Step S204, referencing Arrow (2) in FIG. 5). This causes the regulator valve 200 to operate in the closing direction.

Following this, the CPU 4 stores, as the control signal Mv(1-2) at the second intermediate opening X1, the control signal Mv at the time that the valve opening signal Pv began to move (Step S205).

Following this, when the CPU 4 has confirmed that the valve opening signal Pv has begun to move, it increases the control signal Mv until the valve opening signal Pv has reached Pv(2) (Step S206, referencing the Arrows (3) and (4) in FIG. 5). This causes the regulator valve 200 to operate in the opening direction.

Following this, the CPU 4 stores, as the control signal Mv(2-1) at the first intermediate opening X2, the control signal Mv at the time that the valve opening signal Pv has reached Pv(2) (Step S207).

Following this, when the CPU 4 confirms that the valve opening signal Pv has reached Pv(2), it reduces the control signal Mv until the valve opening signal Pv begins to move (Step S208, referencing Arrow (5) in FIG. 5). This causes the regulator valve 200 to operate in the closing direction.

Following this, the CPU 4 stores, as the control signal Mv(2-2) at the second intermediate opening X2, the control signal Mv at the time that the valve opening signal Pv began to move (Step S209).

Following this, when the CPU 4 has confirmed that the valve opening signal Pv has begun to move, it increases the control signal Mv until the valve opening signal Pv begins to move) (Step S210, referencing the Arrow (6) in FIG. 5).

Moreover, the CPU 4 defines Pv(1) and Mv(1-1) as a first data pair, Pv(2) and Mv(2-1) as a second data pair, Pv(2) and Mv(2-2) as a third data pair, and Pv(1) and Mv(1-2) as a fourth data pair, and calculates, from the first data pair (Pv(1), Mv(1-1)), the second data pair (Pv(2), Mv(2-1)), the third data pair (Pv(2), Mv(2-2)), and the fourth data pair (Pv(1), Mv(1-2)), the input/output characteristic gain G, the hysteresis H, and the intercept C, for the control valve 300 all at once (Step S211).

At this time, the CPU 4 calculates the gain G following Equation (1), above, calculates the hysteresis H following Equation (2), above, and calculates the intercept C following Equation (3), above. After this, the calculated gain G, the hysteresis H, and the intercept C are stored in the memory portion 5 as parameters for the control valve 300 (Step S212).

As can be understood from comparing FIG. 3 and FIG. 5, in the Another Example, the reciprocating operation of the regulator valve 200 is limited to a small range of the first intermediate opening X1 and the second intermediate opening X2, and thus has the benefit of being completed more quickly than the operation in the Example. Note that, in the Example and Another Example, the sequence with which the control signals Mv are changed is not limited to one of the sequences illustrated in FIG. 3 and FIG. 5.

Furthermore, while in FIG. 3 and FIG. 5 the gain and the intercept were calculated at the center portion of the reciprocating operation, if the slopes are different when the control signal Mv is rising versus falling, then two different gains may be obtained, and used when establishing the control parameters. In this case, the gain of the regulator valve 200 when operating in the opening direction may be calculated as Gopen=(Pv(2)−Pv(1))/(Mv(2-1)−Mv(1-1)) and the gain of the regulator valve 200 when operating in the closing direction may be calculated as Gclose=(Pv(2)−Pv(1))/(Mv(2-2)−Mv(1-2)), the control parameters for an operation in the opening direction, used when the regulator valve 200 is operating in the opening direction, may be calculated based on the gain Gopen for when operating in the opening direction, and the control parameters for an operation in the closing direction, used when the regulator valve 200 is operating in the closing direction, may be calculated based on the gain Gclose for when operating in the closing direction.

Moreover, while in the Example and Another Example, set forth above, the four data pairs, namely the first data pair (Pv(1), Mv(1-1)), the second data pair (Pv(2), Mv(2-1)), the third data pair (Pv(2), Mv(2-2)), and the fourth data pair (Pv(1), Mv(1-2)), were used to calculate the gain G, the hysteresis H, and the intercept C, any one of these for data pairs may be omitted.

For example, if the fourth data pair (Pv(1), Mv(1-2)), the last obtained in the sequence in FIG. 3, were omitted, still the gain G, the hysteresis H, and the intercept C could be calculated using Equations (4), (5), and (6), below.

$$G=(Pv(2)-Pv(1))/(Mv(2-1)-Mv(1-1)) \quad (4)$$

$$H=Mv(2-1)-Mv(2-2) \quad (5)$$

$$C=Pv(2)-Gx(Mv(2-1)+Mv(2-2))/2 \quad (6)$$

For example, if the third data pair (Pv(2), Mv(2-2)), the last obtained in the sequence in FIG. 5, were omitted, still the gain G, the hysteresis H, and the intercept C could be calculated using Equations (7), (8), and (9), below.

$$G=(Pv(2)-Pv(1))/(Mv(2-1)-Mv(1-1)) \quad (7)$$

$$H=Mv(1-1)-Mv(1-2) \quad (8)$$

$$C=Pv(1)-Gx(Mv(1-1)+Mv(1-2))/2 \quad (9)$$

Because the gain G, hysteresis H, and the intercept C can be calculated from three data pairs, using Equations (4), (5), and (6) or Equations (7), (8), or (9), instead of Equations (1), (2), and (3), there is the advantage of being able to complete the operation more quickly.

Note that while in the examples set forth above the control signals that were changed following a specific sequence were the EPM drive signals My to the EPM 2 in the positioner 100, instead the opening setting signals Iin to the positioner 100 (the input signal to the positioner), the nozzle back pressure Pn to a pilot relay 3 within the positioner 100 (the input pressure to the pressure amplifier within the positioner), or the operating device pressure Po from the positioner 100 to the regulator valve 200 (the input pressure to the operating device that drives the regulator valve) could be changed following a specific sequence and used as the control signal.

Moreover, while in the examples set forth above the valve opening for obtaining the first data pair (Pv(1), Mv(1-1)) and the valve opening for obtaining the fourth data pair (Pv(1), Mv(1-2)) were both the same intermediate opening X1, and the valve opening for obtaining the second data pair (Pv(2), Mv(2-1)) and the valve opening for obtaining the third data pair (Pv(2), Mv(2-2)) were both the same intermediate opening X2, these need not necessarily be identical openings, but rather each data pair may have different openings. Even if each of the data pairs has different openings, still the gain G, the hysteresis H, and the intercept C can be calculated easily through geometric calculations.

Extended Examples

While the present invention has been explained above in reference to examples, the present invention is not limited to the examples set forth above. The structures and details of the present invention may be modified in a variety of ways, as can be understood by those skilled in the art, within the scope of the present invention. Moreover, the present invention may be embodied through combining the various examples, insofar as there are no contradictions.

The invention claimed is:

1. A parameter acquiring device for acquiring parameters for a control valve that is structured from a regulator valve and a positioner that controls an opening of the regulator valve, the parameter acquiring device comprising:
  a controlling valve operating unit that operates a controlling valve in an opening direction and in a closing direction by changing, in a specific sequence, a control signal that controls the opening of the regulator valve;
  a valve opening signal acquiring unit that acquires, as a valve opening signal, a signal indicating an actual opening of the regulator valve;
  a parameter calculator that:
    defines, as a first data pair, the valve opening signal and the control signal when the regulator valve is at a first intermediate opening when the regulator valve is operating in the opening direction,
    defines, as a second data pair, the valve opening signal and the control signal when the regulator valve is at a second intermediate opening when the regulator valve is operating in the opening direction,
    defines, as a third data pair, the valve opening signal and the control signal when the regulator valve is at a third intermediate opening when the regulator valve is operating in the closing direction,
    defines, as a fourth data pair, the valve opening signal and the control signal when the regulator valve is at a fourth intermediate opening when the regulator valve is operating in the closing direction,
    acquires at least three of the first through fourth data pairs, and
    calculates, at once, at least two parameters of the control valve based on the data pairs that have been acquired; and
  a memory storing the at least two parameters,
    wherein the at least two parameters are used as at least one of part of the control signal and a fault evaluation parameter,
    wherein the control signal controls a position of the regulator valve when moving in one of the opening direction and the closing direction.

2. The parameter acquiring device as set forth in claim 1, wherein
  the parameter calculator calculates, as at least one of the at least two parameters, a gain of an input/output characteristic of the control valve.

3. The parameter acquiring device as set forth in claim 1, wherein
  the parameter calculator calculates, as at least one of the at least two parameters, a hysteresis of an input/output characteristic of the control valve.

4. The parameter acquiring device as set forth in claim 1, wherein
  the parameter calculator calculates, as at least one of the at least two parameters, an intercept of an input/output characteristic of the control valve.

5. The parameter acquiring device as set forth in claim 1, wherein
  the parameter calculator calculates:
    an opening control parameter operating in the opening direction, for use when the regulator valve is operated in the opening direction, based on the first data pair and the second data pair, and
    a closing control parameter operating in the closing direction, for use when the regulator valve is operated in the closing direction, based on the third data pair and the fourth data pair.

6. The parameter acquiring device as set forth in claim 1, wherein
  the parameter calculator defines the first intermediate opening and the fourth intermediate opening as a same opening and defines the second intermediate opening and the third intermediate opening as a same opening, and calculates a parameter for the control valve based on the data pairs obtained.

7. The parameter acquiring device as set forth in claim 1, wherein
  the control signal is an input signal to the positioner, a drive signal to an electropneumatic converter within the positioner, an input pressure into a pressure amplifier within the positioner, or an input pressure from the positioner into an operating device that drives the regulator valve.

8. A parameter acquiring method for acquiring parameters for a control valve that is structured from a regulator valve and a positioner that controls an opening of the regulator valve, the parameter acquiring method comprising the steps of:
  operating a controlling valve in an opening direction and in a closing direction by changing, in a specific sequence, a control signal for controlling the opening of the regulator valve;
  a valve opening signal acquiring step acquiring, as a valve opening signal, a signal indicating an actual opening of the regulator valve; and
  a parameter calculating step comprising the steps of:
    defining, as a first data pair, the valve opening signal and the control signal when the regulator valve is at a first intermediate opening when the regulator valve is operating in the opening direction,
    defining, as a second data pair, the valve opening signal and the control signal when the regulator valve is at a second intermediate opening when the regulator valve is operating in the opening direction,
    defining, as a third data pair, the valve opening signal and the control signal when the regulator valve is at a third intermediate opening when the regulator valve is operating in the closing direction,
    defining, as a fourth data pair, the valve opening signal and the control signal when the regulator valve is at a fourth intermediate opening when the regulator valve is operating in the closing direction,
    acquiring at least three of the first through fourth data pairs, and
    simultaneously calculating at least two parameters of the control valve based on the data pairs that have been acquired;
  storing, in a memory, the at least two parameters; and
  using the at least two parameters as at least one of part of the control signal and a fault evaluation parameter,
    wherein the control signal controls a position of the regulator valve when moving in one of the opening direction and the closing direction.

* * * * *